US009470966B2

(12) United States Patent
Sumiyoshi et al.

(10) Patent No.: US 9,470,966 B2
(45) Date of Patent: Oct. 18, 2016

(54) IMAGE PROJECTION APPARATUS AND PRESENTATION SYSTEM

(71) Applicants: Shinichi Sumiyoshi, Kanagawa (JP); Fumihiro Nakashige, Kanagawa (JP); Otoichi Nakata, Kanagawa (JP)

(72) Inventors: Shinichi Sumiyoshi, Kanagawa (JP); Fumihiro Nakashige, Kanagawa (JP); Otoichi Nakata, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 52 days.

(21) Appl. No.: 14/453,741

(22) Filed: Aug. 7, 2014

(65) Prior Publication Data
US 2015/0049309 A1 Feb. 19, 2015

(30) Foreign Application Priority Data

Aug. 14, 2013 (JP) .................................. 2013-168415

(51) Int. Cl.
G03B 21/00 (2006.01)
G03B 21/26 (2006.01)
G02B 26/00 (2006.01)
G03B 17/54 (2006.01)
G06F 3/03 (2006.01)
G06F 3/038 (2013.01)
G06F 3/042 (2006.01)
G06F 3/0354 (2013.01)
H04N 9/31 (2006.01)

(52) U.S. Cl.
CPC ............ G03B 21/26 (2013.01); G02B 26/008 (2013.01); G03B 17/54 (2013.01); G06F 3/0304 (2013.01); G06F 3/0386 (2013.01); G06F 3/03542 (2013.01); G06F 3/0425 (2013.01); H04N 9/3114 (2013.01); H04N 9/3179 (2013.01); H04N 9/3194 (2013.01)

(58) Field of Classification Search
CPC ............ G03B 21/00; G06F 3/41; G09G 5/00

USPC .............................. 353/97; 345/156, 180, 179
See application file for complete search history.

(56) References Cited

U.S. PATENT DOCUMENTS

2001/0055060 A1* 12/2001 Kitazawa .................. H04N 5/74
348/61
2004/0041786 A1* 3/2004 Inoue ..................... G06F 3/0386
345/156
2008/0030461 A1* 2/2008 Matsui .................... G06F 3/011
345/156

FOREIGN PATENT DOCUMENTS

JP 11-271675 10/1999

OTHER PUBLICATIONS

U.S. Appl. No. 14/330,078, filed Jul. 14, 2014.

Primary Examiner — Steven H Whitesell Gordon
Assistant Examiner — Jerry Brooks
(74) Attorney, Agent, or Firm — Oblon, McClelland, Maier & Neustadt, L.L.P.

(57) ABSTRACT

The present invention is concerning an image projection apparatus comprising: a projecting unit that projects and displays on a projection surface each image in a time sharing manner for each of a plurality of color components, for an input image signal; a shooting unit that shoots a projected image on the projection surface; a shoot control unit that makes the shooting unit perform the shooting, when a detection mode of a irradiation point at which light is irradiated from an irradiation device on the projection surface is set, in timing shifted by a certain amount of time from a synchronized state to time sharing timing of each color component in the projecting unit; and an irradiation-point-position detecting unit that detects, from a projected image projected by the projecting unit, a position of the irradiation point on the image.

8 Claims, 13 Drawing Sheets

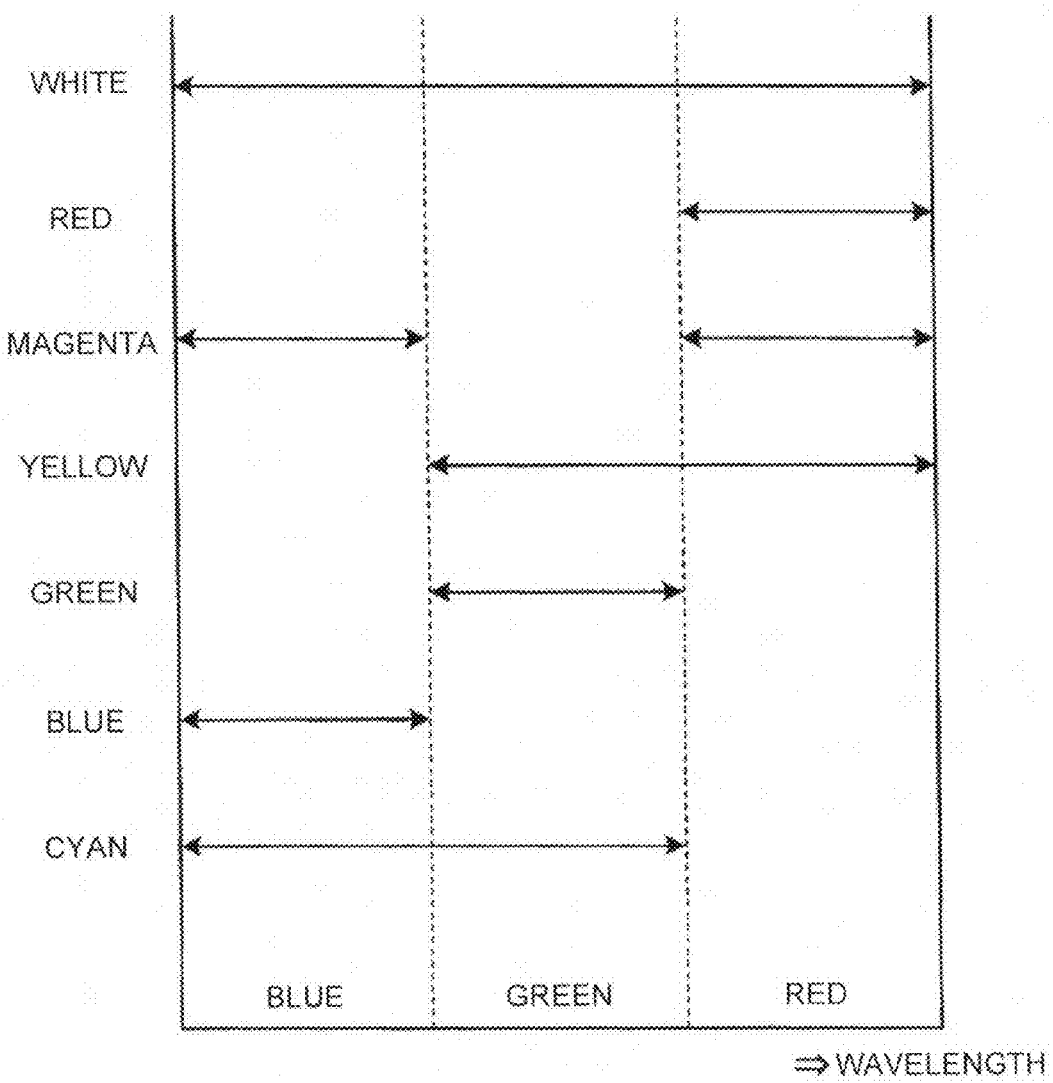

IMAGE PROJECTION APPARATUS AND PRESENTATION SYSTEM

CROSS-REFERENCE TO RELATED APPLICATIONS

The present application claims priority to and incorporates by reference the entire contents of Japanese Patent Application No. 2013-168415 filed in Japan on Aug. 14, 2013.

BACKGROUND OF THE INVENTION

1. Field of the Invention

The present invention relates to an image projection apparatus and a presentation system, and more specifically, to an image projection apparatus that converts image data to an optical image to project on a projection surface (screen) in an enlarged manner, and a presentation system to perform presentation, for example, pointing by irradiation light from an irradiation device (laser pointer and the like) on a projected image on the projection surface.

2. Description of the Related Art

Projectors project images such as characters and graphs on a screen (projection surface) in an enlarged manner, and therefore, are widely used in presentations to a number of people and the like. In such a presentation, a presenter (user) sometimes uses a laser pointer, an infrared laser pointer, or the like to point an image projected on a screen to make explanation easy to understand. However, in such a case, because a point that is pointed by the pointer moves as the hand operating the pointer moves, an exact pointed position can be unclear to people that are looking at the projected image. To solve the problem, a technique in which a point irradiated with an infrared laser pointer by a user is detected by a charge coupled device (CCD) camera that is equipped in a projector, and a pointer image is displayed at the same point (position) as this irradiation point (irradiation position) has been known (for example, Japanese Laid-open Patent Publication No. 11-271675).

However, when a laser pointer is used, if detection of a point irradiated by the laser pointer from a picture captured by a camera is considered similarly to Japanese Laid-open Patent Publication No. 11-271675, and if color and brightness of the projected picture are similar to color of the laser pointer, there is a possibility that the irradiation point of the laser pointer cannot be detected depending on a projected image. Particularly, for a digital light processing (DLP) (registered trademark) projector, there is a possibility that an irradiation point cannot be detected stably because of influence of leakage light from an adjacent filter segment in a different color in a color wheel.

SUMMARY OF THE INVENTION

It is an object of the present invention to at least partially solve the problems in the conventional technology.

According to the present invention, there is provided an image projection apparatus comprising: a projecting unit that projects and displays on a projection surface each image in a time sharing manner for each of a plurality of color components, for an input image signal; a shooting unit that shoots a projected image on the projection surface; a shoot control unit that makes the shooting unit perform the shooting, when a detection mode of a irradiation point at which light is irradiated from an irradiation device on the projection surface is set, in timing shifted by a certain amount of time from a synchronized state to time sharing timing of each color component in the projecting unit; and an irradiation-point-position detecting unit that detects, from a projected image projected by the projecting unit, a position of the irradiation point on the image.

The present invention also provides a presentation system comprising: a projecting unit that projects and displays, on a projection surface, each image in a time sharing manner for each of a plurality of color components, for an input image signal; a shooting unit that shoots a projected image on the projection surface; an irradiation device that forms an irradiation point by irradiating light onto the projection surface; a shoot control unit that makes the shooting unit perform the shooting, when a detection mode of a irradiation is set, in timing shifted by a certain amount of time from a synchronized state to time sharing timing of each color component in the projecting unit; and an irradiation-point-position detecting unit that detects, from the projected image shot by the shooting unit, a position of the irradiation point on the image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram indicating a correlation between the seven segments of the color wheel and a camera-captured image when each segment is displayed on a projection surface;

DETAILED DESCRIPTION OF THE PREFERRED EMBODIMENTS

Figure 1:
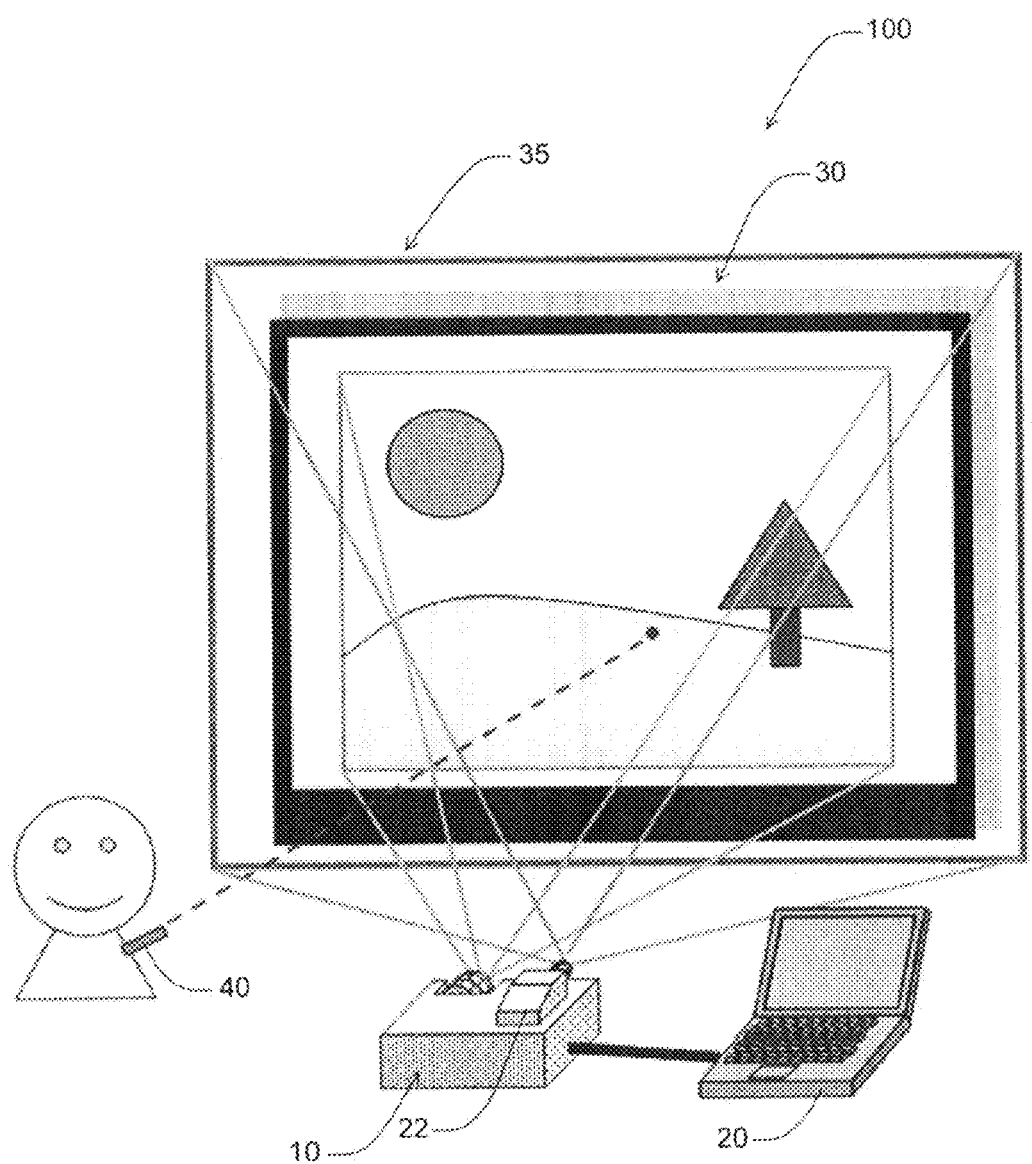
FIG. 1 is a diagram illustrating a configuration of a presentation system according to an embodiment of the present invention.

One embodiment of the present invention is explained below based on FIG. 1 to FIG. 15. FIG. 1 illustrates a configuration of a presentation system 100 according to the embodiment.

The presentation system 100 includes, for example, as illustrated in FIG. 1, a projector device 10 as an image projection apparatus, a personal computer (hereinafter "external PC") 20 that is connected through a cable (a high definition multimedia interface (HDMI) (registered trademark) cable, a video graphics array (VGA) cable, or an analog red-green-blue (RGB) component video signal cable) or the like to be an output source of presentation image data, and the like.

The projector device 10 converts image data such as a still image and a moving image input from the external PC 20 into an optical image, to project on a screen 30 that is a projection surface. Not limited to the external PC 20, a still image, a moving image, and the like may be input to the projector device 10 from a storage device such as a universal serial bus (USB) memory and a secure digital (SD) card.

Moreover, in the presentation system 100, the projector device 10 is integrally equipped with a camera unit 22 as a shooting unit to shoot an image that is projected on the screen 30 as a projection area 35 thereof.

The projector device 10 of this presentation system 100 stores a presentation control program to detect a position of an irradiation point of a laser beam from a laser pointer 40 on the projection area 35 based on an image of the projection area 35 that is taken at a certain frame rate (for example, 30 frames/second) by the camera unit 22, and to combine a pointer image and other emphasizing images at an appropriate point in the presentation image data based on the position of the irradiation point with the image to be projected, not just converting presentation image data from the external PC 20 into an optical image to project in an enlarged manner according to an operation by a user. An emphasizing image includes, for example, an under line, a box, and the like.

A shooting range of a projected image on the screen 30 of the camera unit 22 is only required to be a range that sufficiently includes therein the projection area 35, and is not necessarily required to fit exactly with the projection area 35.

The projector device 10 includes, thereinside, an optical engine unit 10a (see FIG. 2), and a base control unit 10b (see FIG. 3) that performs control of video signals and control of the optical engine unit 10a.

Figure 2:
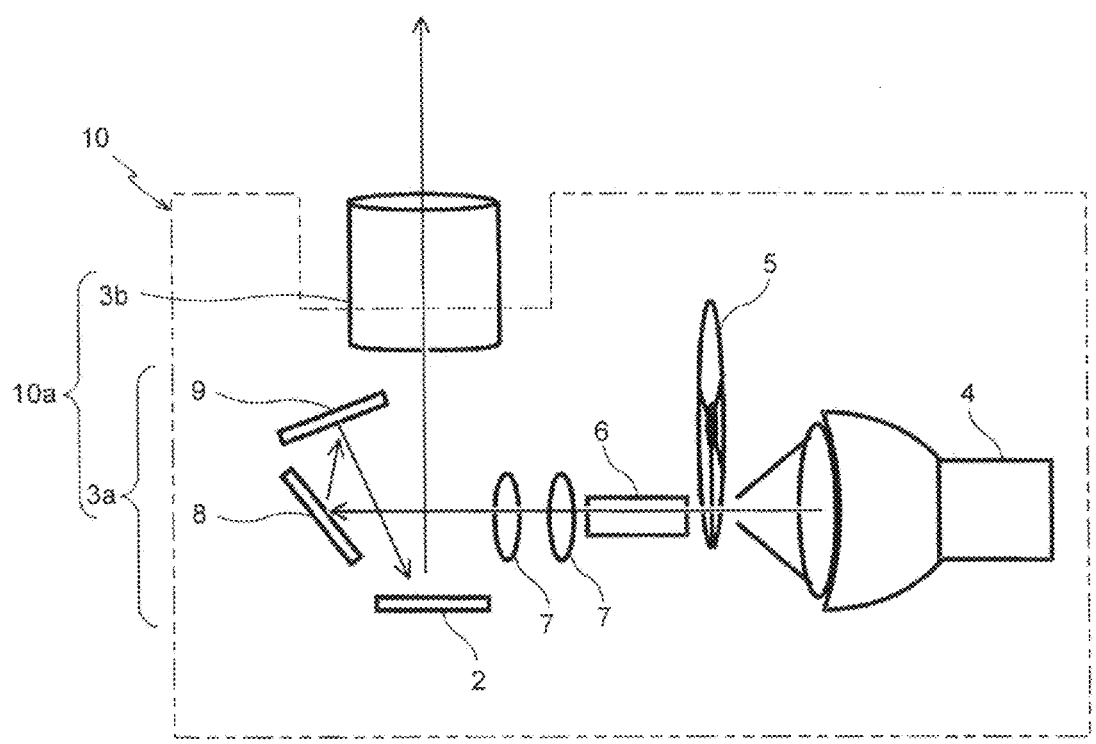
FIG. 2 is a schematic diagram illustrating a configuration of an optical engine of a projector device that constitutes a part of the presentation system in FIG. 1.

The optical engine unit 10a includes an optical system 3a and a projection system 3b as shown in FIG. 2. The optical system 3a includes a color wheel 5, a light tunnel 6, a relay lens 7, a flat mirror 8, a concave mirror 9, and an image forming unit 2. Each of these components is arranged in a main unit of the projector device 10.

The color wheel in a disc shape converts white light from a light source 4 into light in RGB each of which repeats every unit time to be emitted to the light tunnel 6. As the light source 4, for example, a high-pressure mercury lamp is used in this example. The light source 4 irradiates white light toward the optical system 3a (the color wheel 5). In the present embodiment, a lighting drive of the light source 4 through a lamp power source 17, and a motor 18 (see FIG. 3) that drives to rotate the color wheel 5 are both controlled by a drive control unit 14 (see FIG. 3) described later.

To the color wheel 5, a black sticker as an index to detect a rotation position thereof is arranged. The black sticker is detected by a marker sensor 19 (see FIG. 3) as a detecting unit that is arranged adjacent to a peripheral end thereof, and thus a predetermined rotation position is detected. A detection signal thereof is input to the drive control unit 14. A detailed configuration of the color wheel 5 is described further later.

The light tunnel 6 is formed in a cylindrical shape by putting sheet glasses together, and guides light emitted from the color wheel 5 to the relay lens 7.

The relay lens 7 is formed with two pieces of lenses in combination, and corrects axial chromatic aberration of light emitted from the light tunnel 6 to send the light to a reflection surface of the flat mirror 8.

The flat mirror 8 and the concave mirror 9 sequentially reflect light emitted from the relay lens 7 to guide to the image forming unit 2.

That is, in the optical system 3a, white light irradiated from the light source 4 is separated into RGB, and guided to the image forming unit 2, as described above.

The image forming unit 2 is formed with multiple micro mirrors that are enabled to switch the position of inclination to each of an ON position and an OFF position, and has a micro mirror array that can form a mirror plane in a rectangular shape as a whole. As the mirror array, digital mirror devices (DMD: registered trademark of Texas Instruments Inc.) are used in this example. In the image forming unit 2, each of the micro mirrors is driven in time sharing drive based on data of video or an image, and projection light is processed so as to form predetermined image data to be reflected. The image forming unit 2 performs image forming according to a modulation signal.

Furthermore, an OFF light plate that receives and absorbs unnecessary light that is not used as projection light among incident light to the image forming unit 2 is arranged above the image forming unit 2 in a perpendicular direction that is on a frontward side of the image forming unit 2 illustrated in FIG. 2 on a sheet. When light enters into the image forming unit 2, the micro mirrors operate in a time sharing manner by the action of the DMD devices based on video data, and light to be used is reflected toward the projection system 3b by these micro mirrors, and light to be discarded is reflected toward the OFF light plate.

The projection system 3b is formed with multiple lenses, and expands the video light from the image forming unit 2 with the lenses, to project on the screen 30.

Figure 3:
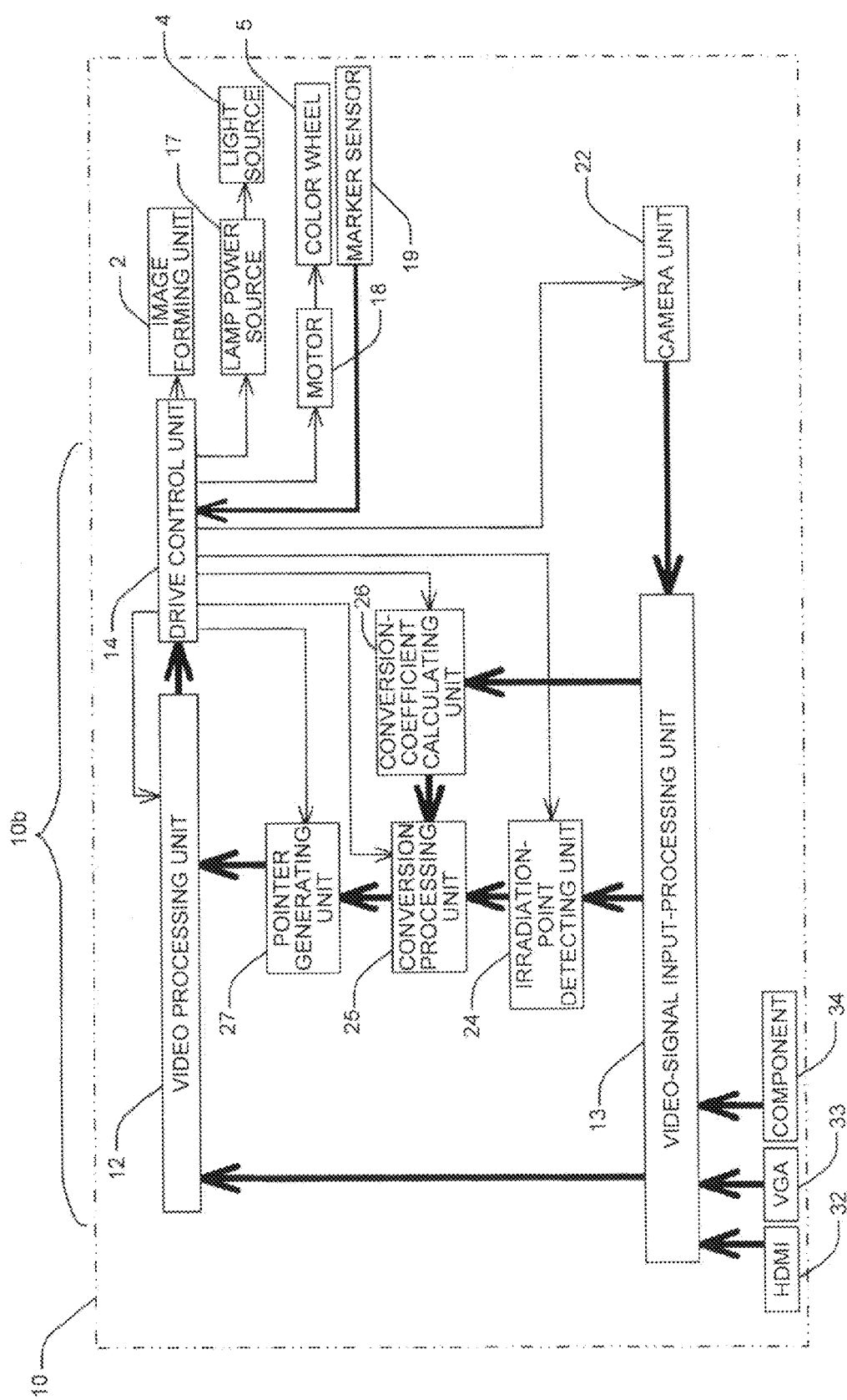
FIG. 3 is a block diagram indicating a configuration of the projector device, particularly, functions that constitute a base control unit.

The base control unit 10b includes various functional units such as a video processing unit 12, a video-signal input-processing unit 13, the drive control unit 14, an irradiation-point detecting unit 24 as an irradiation-point-position detecting unit, a conversion processing unit 25, a conversion-coefficient calculating unit 26, and a pointer generating unit 27 as indicated in a block diagram of the projector device 10 shown in FIG. 3.

These respective functional units are actually implemented by a hardware configuration that constitutes the projector device 10 together with a CCD camera module constituting the camera unit 22 and a program. The above hardware configuration includes a central processing unit (CPU) (processor) that controls operation of the entire projector device 10, a read-only memory (ROM) that stores various kinds of programs executed by the CPU, a random access memory (RAM) that is used as a work area of the CPU, and a storage device (for example, a hard disk drive (HDD), a solid state drive (SSD), and the like) that stores various kinds of data such as a program for the projector device, and the like. In FIG. 3, an arrow in a thick solid line indicates a flow of data such as image data, and an arrow in a thin solid line indicates control data (command data and the like).

To the video-signal input-processing unit 13, various kinds of input terminals such as an HDMI (registered trademark) terminal 32, a VGA terminal 33, and a component signal terminal 34 are connected. Through these input terminals, a digital signal such as an HDMI (registered trademark) signal, an analog signal such as a VGA signal, and an analog signal such as an RGB component video signal are input to the video-signal input-processing unit 13 from an external device or the camera unit 22 connected to respective input terminals. As one example, when an input video signal is a digital signal, the video-signal input-processing unit 13 converts the signal into a bit format defined by the video processing unit 12, according to the number of bits of the input signal. Furthermore, when an input video signal is an analog signal, the video-signal input-processing unit 13 performs analog-to-digital conversion (ADC) processing and the like to perform digital sampling of the analog signal, and inputs a signal in an RGB or a YPbPr format into the video processing unit 12. Moreover, to the video-signal input-processing unit 13, image data of a projection image that is shot by the camera unit 22 is also input.

The video processing unit 12 performs digital image processing and the like according to an input signal. Specifically, appropriate image processing according to contrast, brightness, chroma, hue, RGB gain, sharpness, a scaler function to scale up and down and the like, and characteristics of the drive control unit 14 is performed. The input signal subjected to the digital image processing is sent to the drive control unit 14. Furthermore, the video processing unit 12 can also generate an image signal in a layout arbitrarily specified, or registered. The video processing unit 12 also generates an image signal in a projection pattern (image pattern for projection conversion) indicated in FIG. 4. As an example of a projection pattern that is projected when a projection conversion coefficient is calculated, a grid pattern, a circle pattern, or the like may be used other than the one indicated in FIG. 4.

The drive control unit 14 determines driving conditions for the color wheel 5 to color white light according to the input signal, the image forming unit 2 that selects light to be emitted and discarded, and the lamp power source 17 that controls a drive current of a lamp, and sends an instruction to drive to the motor 18 that drives to rotate the color wheel 5, the image forming unit 2, and the lamp power source 17. The drive control unit 14 controls the color wheel 5 to generate colors sequentially.

The drive control unit 14 sends an instruction to shoot to the camera unit 22 according to a synchronization signal in timing of image projection. The shoot timing through the camera unit 22 is described later. Although in the present embodiment, the drive control unit 14 also serves as the shoot control unit (shoot control unit), each of the components may be arranged independently. When an image shot by the camera unit 22 is input to the video-signal input-processing unit 13, the video-signal input-processing unit 13 performs shading correction, Bayer conversion, color correction, and the like on a shot camera image to generate an RGB signal.

The drive control unit 14 further shoots a projection pattern (projection image) projected on the screen from the projector device 10 using the camera unit 22, and performs processing to calculate a projection conversion coefficient from displacement between coordinates on the projection pattern (projection image) and coordinates on the image data, and processing to detect an irradiation point of a laser beam from the laser pointer 40. Details of the processing performed by the drive control unit 14 are explained later.

Figure 4:
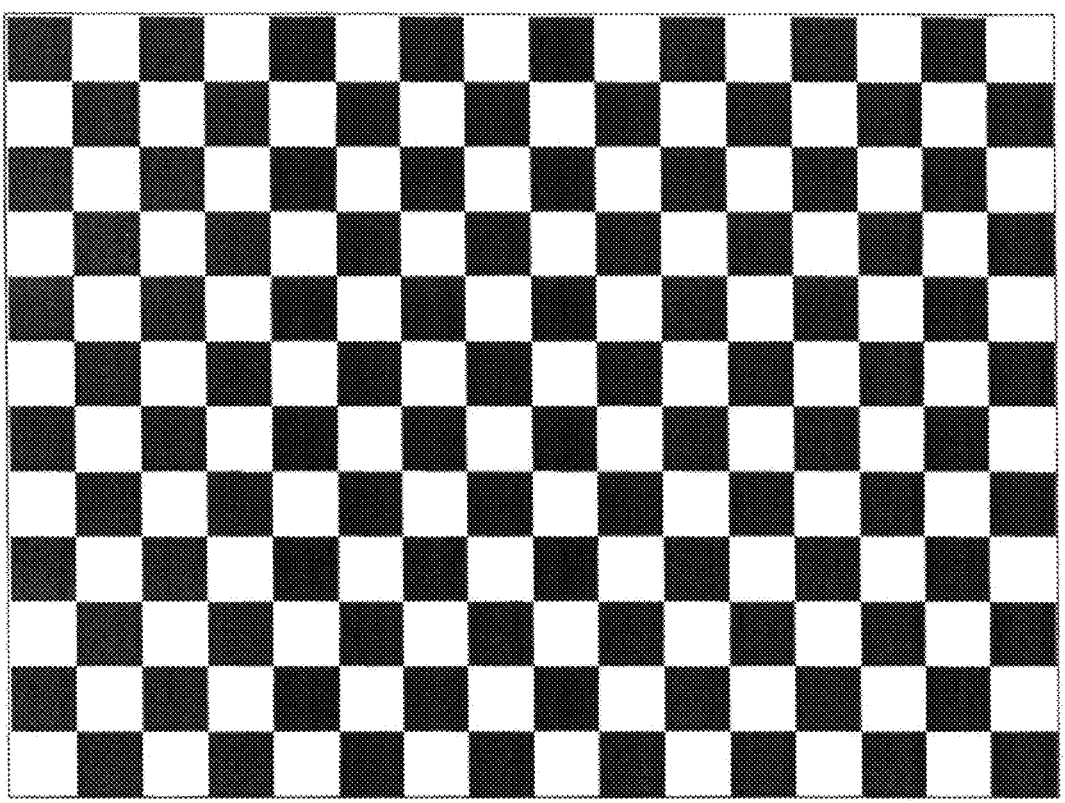
FIG. 4 is a diagram illustrating an example of a projection pattern for projection conversion.

The camera unit 22 includes a CCD camera module as described above, and shoots a scene in which the projection pattern indicated in FIG. 4 is projected. As a shooting mode of the camera unit 22, a global shutter mode and a rolling shutter mode are applicable. In the global shutter mode, exposure thereof is performed simultaneously for all pixels, and although a more complicated circuit than that of the rolling shutter mode is necessary for each of the pixels, there is an advantage that all of the pixels are exposed at once to perform shooting. In the rolling shutter mode, a sequential scanning type of exposure is performed, and implementation is possible with simple circuits, and shooting can be performed in a scanning form. However, because shooting timing differ in each pixel, distortion and the like can occur when an object moving at high speed is imaged. The shutter speed of the camera unit 22 is desirable to be controlled by the drive control unit 14. The drive control unit 14 controls by determining the shutter speed required for shooting in timing and in time specified by a synchronization signal, for example, based on the rotation speed of the color wheel, to perform control.

The conversion processing unit 25 performs projection conversion from coordinates of an irradiation point (x', y') into coordinates on image data (x, y) using a projection conversion coefficient H that is calculated by the conversion-coefficient calculating unit 26 described later.

When image data of a projection image shot by the camera unit 22 is input, the conversion-coefficient calculating unit 26 calculates the projection conversion coefficient H that associates coordinates on a video signal of the projection pattern (x, y) and coordinates on the shot image (x', y') based on data of a shot image, and sets the projection conversion coefficient H in the conversion processing unit 25.

The pointer generating unit 27 generates irradiation-point image data (emphasizing image data) at the coordinates (x, y). The irradiation-point image data is, for example, a circular shape image having a radius of z pixel length at the coordinates (x, y) in center (that is, data of a box described above, a pointer image that is registered in advance, an underline, or the like may be generated in an arbitrary generation method). The pointer generating unit 27 performs these calculations, and generates a projection image signal to send to the video processing unit 12.

Explanation returns to the video processing unit 12 again. The video processing unit 12 superimposes a video signal that is generated by the pointer generating unit 27 on the video signal and performs arbitrary image processing thereon, and then sends the signal subjected to the image processing to the drive control unit 14. When the signal subjected to the image processing is output to the drive control unit 14, the drive control unit 14 controls the image forming unit 2, the lamp power source 17, and the motor 18 based on the signal subjected to the image processing described above, and the projection image on which the pointer image is superimposed is projected from the projection system 3*b*.

Figure 5:
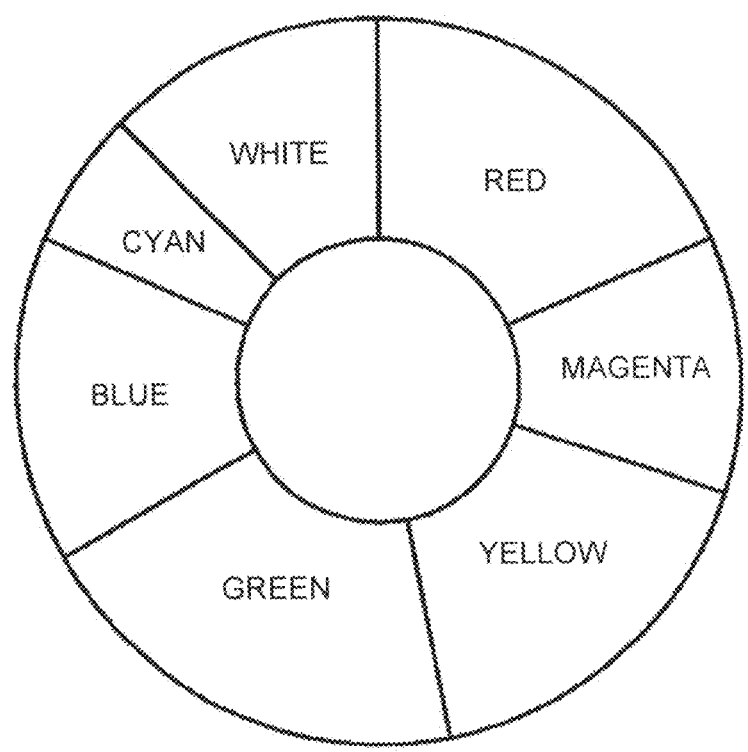
FIG. 5 is a diagram indicating seven segments of Cy-W-R-M-Y-G-B constituting a color wheel.

Next, details of processing of detecting coordinates of a pointer that is irradiated on a projection surface performed by the irradiation-point detecting unit 24 are explained. In FIG. 5, filter segments in various colors constituting a color wheel, namely, filter segments (areas) of seven colors of Cy (cyan)-W (white)-R (red)-M (magenta)-Y (yellow)-G (green)-B (blue), for example, are illustrated. Hereinafter, a filter segment is described simply as segment or color segment.

Moreover, in FIG. 6, correlation between seven segments of a color wheel and a camera shot image when each segment is displayed on a projection surface, that is, RGB data. The drive control unit 14 performs control to make light pass through areas of colors of the color wheel 5 that are determined according to color of light of the input image data in a time unit, to realize color of the image data. For example, in the Red segment, transmittance of light in Red (R) (wavelength component) is high and data of Red (R) makes up most in the RGB data also, while transmittance of Green (G) and Blue (B) is low and light in these colors are limited.

Similarly, in a Green segment, data of Green (G) makes up most, and light in Blue (B) and Red (R) (wavelength component) is limited. Similarly, in a Blue segment, data of Blue (B) makes up most, and light in Green (G) and Red (R) (wavelength component) is limited.

Moreover, a Cyan segment, a Magenta segment, and a Yellow segment of secondary colors pass light of Blue and Green, light of Blue and Red, light of Green and Red, respectively. Furthermore, a White segment of a tertiary color passes light of all of RGB.

Figure 7A:
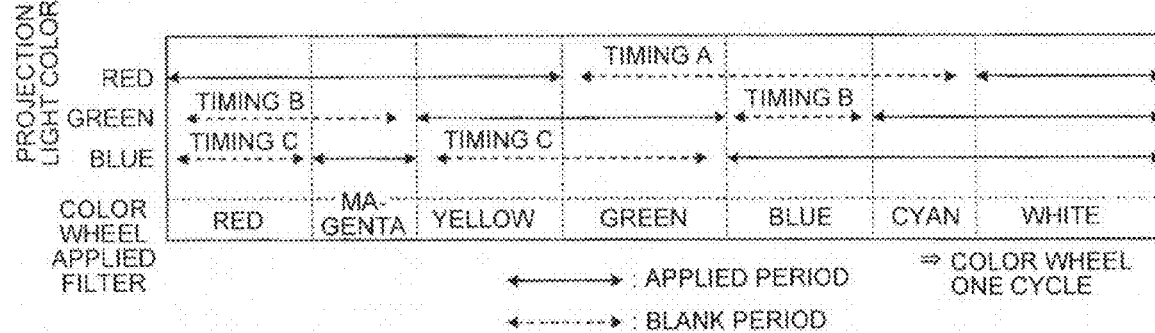
FIG. 7A is a diagram indicating relation between seven color segments (one cycle) of the color wheel and projection light colors.

In FIG. 7A, relationship between the seven color segments of the color wheel 5 and projection light colors is indicated. Light from the light source is irradiated in the entire area of the seven color segments in a circumferential direction while the color wheel 5 rotates once. The light color is a concept that includes both color of light of the light source itself and color of light visually recognized from light emitted from the light source. It is indicated that a section of a period indicated by a solid line arrow in FIG. 7A is an area in which an image signal is projected through the corresponding segment of the color wheel 5 in the color thereof.

For example, focusing on the projection light color Red, components that are categorized as Red are sections of the Red segment, the Magenta segment, and the Yellow segment, and a section of the White segment. On the other hand, a section indicated by a broken line arrow of Timing A is a section in which an optical image corresponding to a Red video signal is not projected. That is, in the sections corresponding to the Green segment, the Blue segment, and the Cyan segment of the color wheel 5 corresponding to the section of this Timing A, even if the projection light color is Red, because an optical image actually corresponding to a video signal is not projected, even a red laser beam from a laser pointer becomes easy to be detected. Similarly, in sections corresponding to respective color segments of the color wheel 5 corresponding to a section of Timing B and a section of Timing C, a laser beam in green and a laser beam in blue from a laser pointer become easy to be detected, respectively.

Accordingly, in the present embodiment, when a laser pointer that irradiates red laser beams (hereinafter, red laser pointer) is used as the laser pointer 40, in detection of a position of an irradiation point of the laser beam, shooting and detection of a red laser beam (irradiation image) that is irradiated on the screen 30 are performed during Timing A.

However, if start and end of the section of Timing A and shooting timing by the camera unit 22 are completely synchronized, leakage light from an adjacent color segment, for example, the Yellow segment or the Red segment, can affect a shooting result of the camera unit 22. Moreover, aged deterioration, specifically, deterioration of a lens or a sensor equipped in the camera unit 22 caused by heat (inaccurate shooting timing, variation in chromaticness, and the like), deterioration of color segments of the color wheel 5 (variations in chromaticness, and the like), and delay of electric signals because of aging of electric parts, and the like can occur.

Figure 7B:
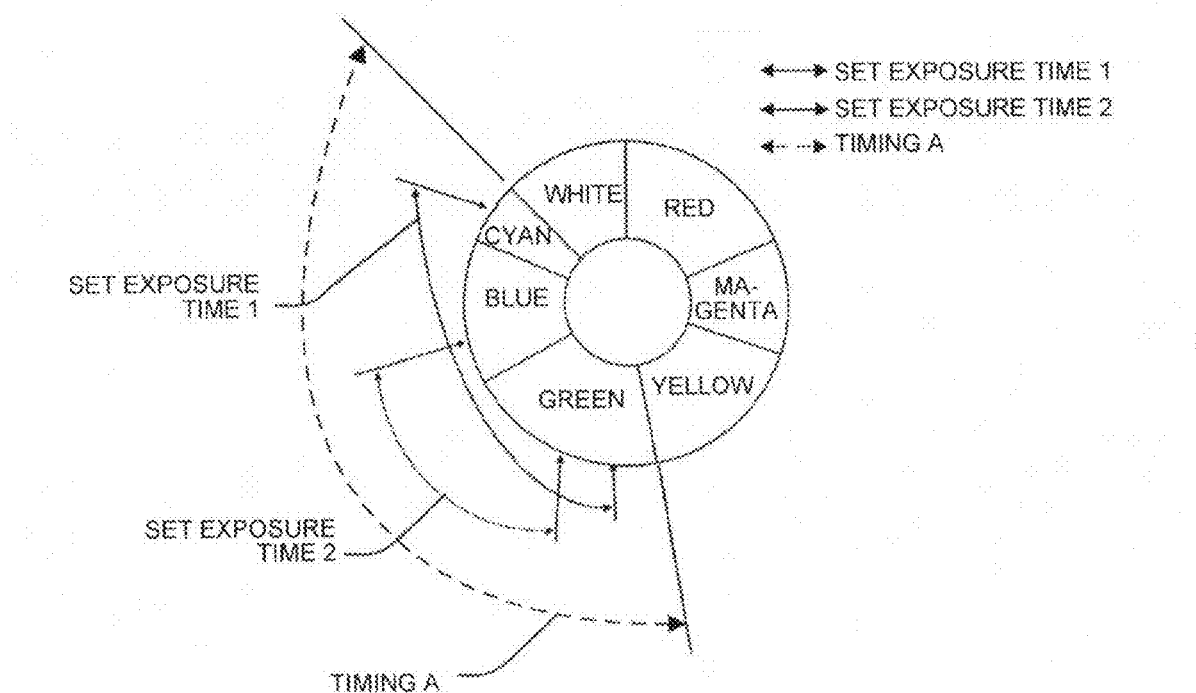
FIG. 7B is an explanatory diagram of relation between a cycle of the color wheel and exposure time of a camera unit.

Therefore, in the present embodiment, timing (exposure time) in which the camera unit 22 images a projection surface on which a red laser beam is irradiated is set to a period, for example, from a point of time delayed by a certain amount of time from start of Timing A to a point of time earlier by a certain amount of time than end of Timing A, as set exposure time 1 and set exposure time 2 indicated in FIG. 7B. As indicated in the set exposure time 1 and the set exposure time 2, when the irradiation point of the red laser beam is detected, the camera unit 22 is set such that exposure time (shooting time) is a period (time) between a point of time when a certain amount of time has passed from an end point of Yellow and a point of time earlier by a certain amount of time than a start point of White in segments of the color wheel 5 (therefore, color of the projection light colored through the segment). As long as shooting is performed within this period (time), the shutter speed can be arbitrarily selected (set).

Similarly, when a laser pointer that irradiates green laser beams (hereinafter, green laser pointer) is used as the laser pointer 40, in detection of a position of an irradiation point of the laser beam, shooting timing (exposure time) of the camera unit 22 is set to a period from a point of time delayed by a certain amount of time from start of Timing B to a point of time earlier by a certain amount of time than end of Timing B. That is, it is set such that a period (time) between a point of time when a certain amount of time has passed from an end point of White and a point of time earlier by a certain amount of time than a start point of Yellow, or a period (time) between a point of time when a certain amount of time has passed from an end point of Green and a point of time earlier by a certain amount of time than a start point of Cyan is the exposure time (shooting time). As long as shooting is performed within this period (time), the shutter speed can be arbitrarily selected (set).

Similarly, when a laser pointer that irradiates blue laser beams (hereinafter, blue laser pointer) is used as the laser pointer 40, in detection of a position of an irradiation point of the laser beam, shooting timing (exposure time) of the camera unit 22 is set to a period from a point of time delayed by a certain amount of time from start of Timing C to a point of time earlier by a certain amount of time than end of Timing C. That is, it is set such that a period (time) between a point of time when a certain amount of time has passed from an end point of White and a point of time earlier by a certain amount of time than a start point of Magenta, or a period (time) between a point of time when a certain amount of time has passed from an end point of Magenta and a point of time earlier by a certain amount of time than a start point of Blue is the exposure time (shooting time). As long as shooting is performed within this period (time), the shutter speed can be arbitrarily selected (set).

Figure 8:
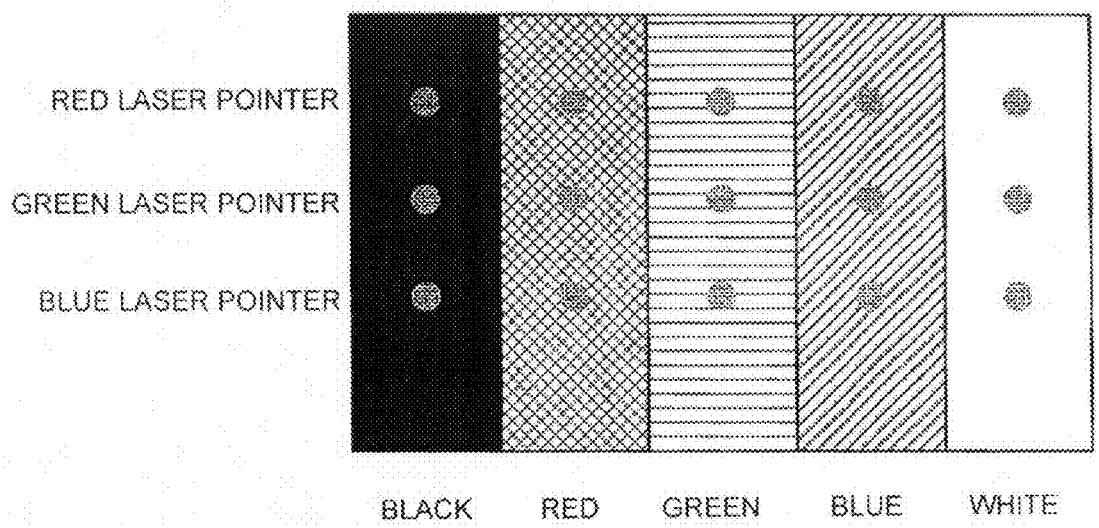
FIG. 8 is a diagram indicating an example of image data when laser beams from red, green, and blue laser pointers are irradiated on one projected image.

FIG. 8 indicates image data when laser beams from red, green, and blue laser pointers are irradiated on one projected image. Furthermore, FIG. 9 indicates images of detected irradiation points of laser beams from laser pointers when a projected image on which laser beams from red, green, and blue laser pointers are irradiated in Timing A, B, and C is shot. For example, Timing A Red Shot Image in FIG. 9 shows one example of image data that is acquired by shooting the screen 30 during the section of Timing A by the camera unit 22.

Figure 9:
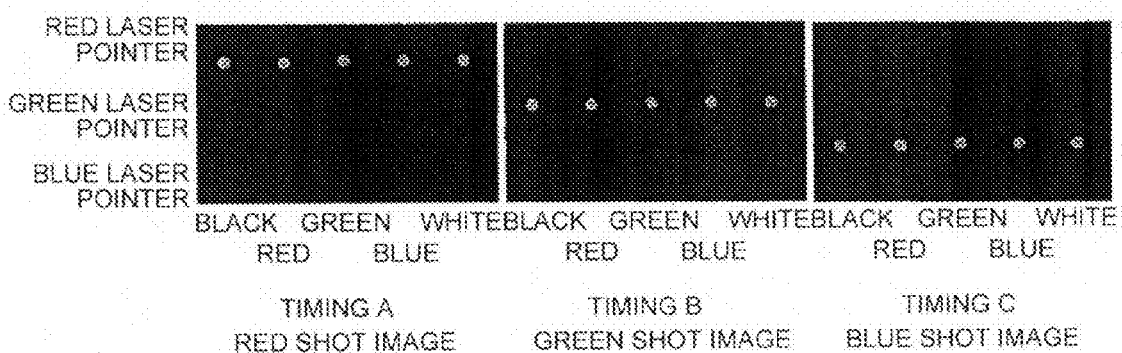
FIG. 9 is a diagram indicating images of detected irradiation points of laser beams when a projected image on which laser beams from red, green, and blue laser pointers are irradiated at Timing A, B, and C, respectively, is shot.

In the example of FIG. 9, the shooting timing of the camera unit 22 is synchronized with timing in which the drive control unit 14 drives the color wheel 5. For example, when the camera unit 22 detects a position of an irradiation point of a laser beam from the red laser pointer, and when shooting is performed in Timing A, because a the color wheel 5 is rotated at a fixed frequency (120 Hertz (Hz) in the present embodiment), a synchronization signal to control the shooting time of the camera unit 22 is set by the drive control unit 14 in timing in which the color wheel 5 corresponds to a predetermined period in Timing A.

In the section of Timing A, light corresponding to a Red video signal is certainly not irradiated, and therefore, detection of an irradiation point of a laser beam from the red laser pointer becomes easy. Accordingly, when irradiation light (laser beam) from the red pointer is detected, based on the above synchronization signal, shooting performed by the camera unit 22 is synchronized to a predetermined period in Timing A. Thus, detection accuracy of an irradiation point of a laser beam from the red laser pointer, and further, detection accuracy of a position of the irradiation point are improved.

Similarly, in Timing B Green Shot Image in Timing B, light corresponding to a Green video signal is not irradiated, and therefore, detection accuracy of an irradiation point and a position thereof of a laser beam from the green laser pointer is improved. Furthermore, in Timing C Blue Shot Image in Timing C, light corresponding to a Blue video signal is not irradiated, and therefore, detection of an irradiation point of a laser beam from the blue laser pointer becomes easy. As described, there is a color that is easy to be detected depending on timing, and by effectively using each Timing, irradiation points of laser beams in multiple colors can be detected at the same time.

Next, a method of synchronizing shooting by the camera unit 22 to driving of the color wheel 5 is explained. The drive control unit 14 acquires a detection signal of a predetermined position from the marker sensor 19 described above, and relative to detection timing thereof, generates (or, instructs a synchronization-signal generating unit not shown to issue) the synchronization signal to control shooting timing of the camera unit 22. The synchronization signal to control shooting timing of the camera unit 22 is different from the synchronization signal to control the color wheel 5 according to a video signal (image signal) generated based on a vertical synchronization signal in the video signal (image signal).

The generated synchronization signal is determined so as to synchronize with a predetermined period within a period in which light in color closest to the color of the set laser pointer is not projected. Thus, the camera unit 22 is enabled to control shutter timing for shooting relative to the detection signal from the marker sensor 19 that detects a predetermined rotation position of the color wheel 5. The color of a laser pointer is set, for example, by inputting through an interface (not shown) for operating the projector device 10 by a user.

Figure 10:
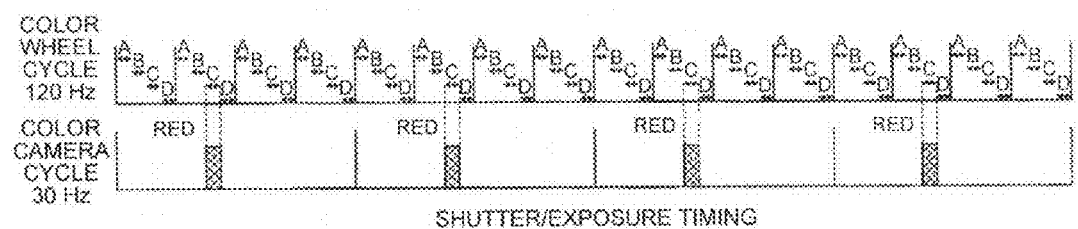
FIG. 10 is a diagram indicating relation among a rotation cycle of the color wheel, a shooting cycle of a camera, and shutter/exposure timing of the camera to detect a single color laser pointer.
Figure 11:
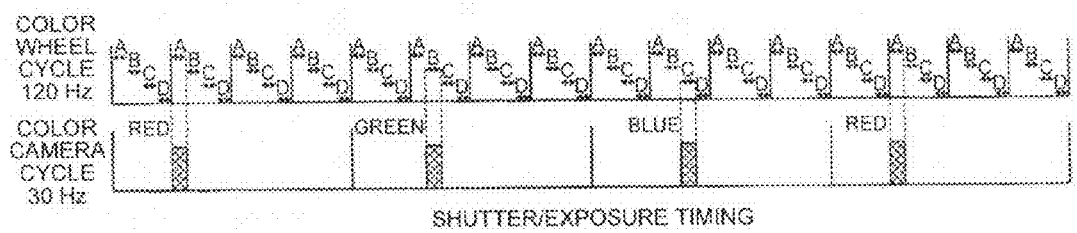
FIG. 11 is a diagram indicating relation among a rotation cycle of the color wheel, a shooting cycle of a camera, and shutter/exposure timing of the camera to detect a multi-color laser pointer.

In FIG. 10 and FIG. 11, one example of relation among a rotation cycle of the color wheel, a shooting cycle, and shutter/exposure timing of the camera unit 22 is indicated. For example, the color wheel 5 rotates in a cycle of 120 Hz, and the camera unit 22 shoots the screen 30 in a cycle of 30 Hz. In this example, while the color wheel 5 rotates four times, the camera unit 22 shoots once. In FIG. 10, an example of shutter/exposure timing when rotation of the color wheel 5 and shooting are synchronized in the case of a laser beam irradiated from the laser pointer 40 including color of red is indicated. In FIG. 10, it is supposed that a section of C is a blank period of Red, that is, a predetermined section (for example, the set exposure time 1 in FIG. 7B described above) in Timing A (corresponding to Green, Blue, and Cyan of the color wheel 5). In this case, the camera unit 22 exposes to one of the sections of C in the first cycle to shoot an image, thereby enabling detection of an irradiation point of a laser beam from the red laser pointer by observing an image shot at this time.

Usually, light is irradiated on the screen 30 when the image forming unit 2 is ON, and not irradiated when OFF. However, in the above example, by performing shooting in synchronization to corresponding timing even when ON, an irradiation point can be detected from color data of either one of RGB. In other words, an irradiation point from the laser pointer 40 can be detected independent of contents of video.

FIG. 11 indicates a synchronization method when a laser pointer has multiple colors. The camera unit 22 exposes to one of sections of A in the first cycle to shoot an image. The section of A in this example is a section corresponding to a predetermined section in Timing A, and by observing image data shot in this timing, an irradiation point of a laser beam from the Red laser pointer can be detected. The camera unit 22 exposes to a section of B in the second cycle to shoot an image. The section of B is a section corresponding to a predetermined section in Timing B, and by observing image data shot in this timing, an irradiation point of a laser beam from the Green laser pointer can be detected. The camera unit 22 exposes to a section of C in the third cycle to shoot an image. The section of C is a section corresponding to a predetermined section in Timing C, and by observing image data shot in this timing, an irradiation point of a laser beam from the Blue laser pointer can be detected.

Similar control is performed thereafter, and irradiation points of red, green, and blue are sequentially detected. In the above case, the synchronization signal includes three kinds of timing of the predetermined section in Timing A in the first cycle, the predetermined section in Timing B in the second cycle, and the predetermined section in Timing C in the third cycle. When more than one pointer in the same color is used, irradiation point are detected as multiple points in a screen, and therefore, detection can be achieved without problems.

Figure 12:
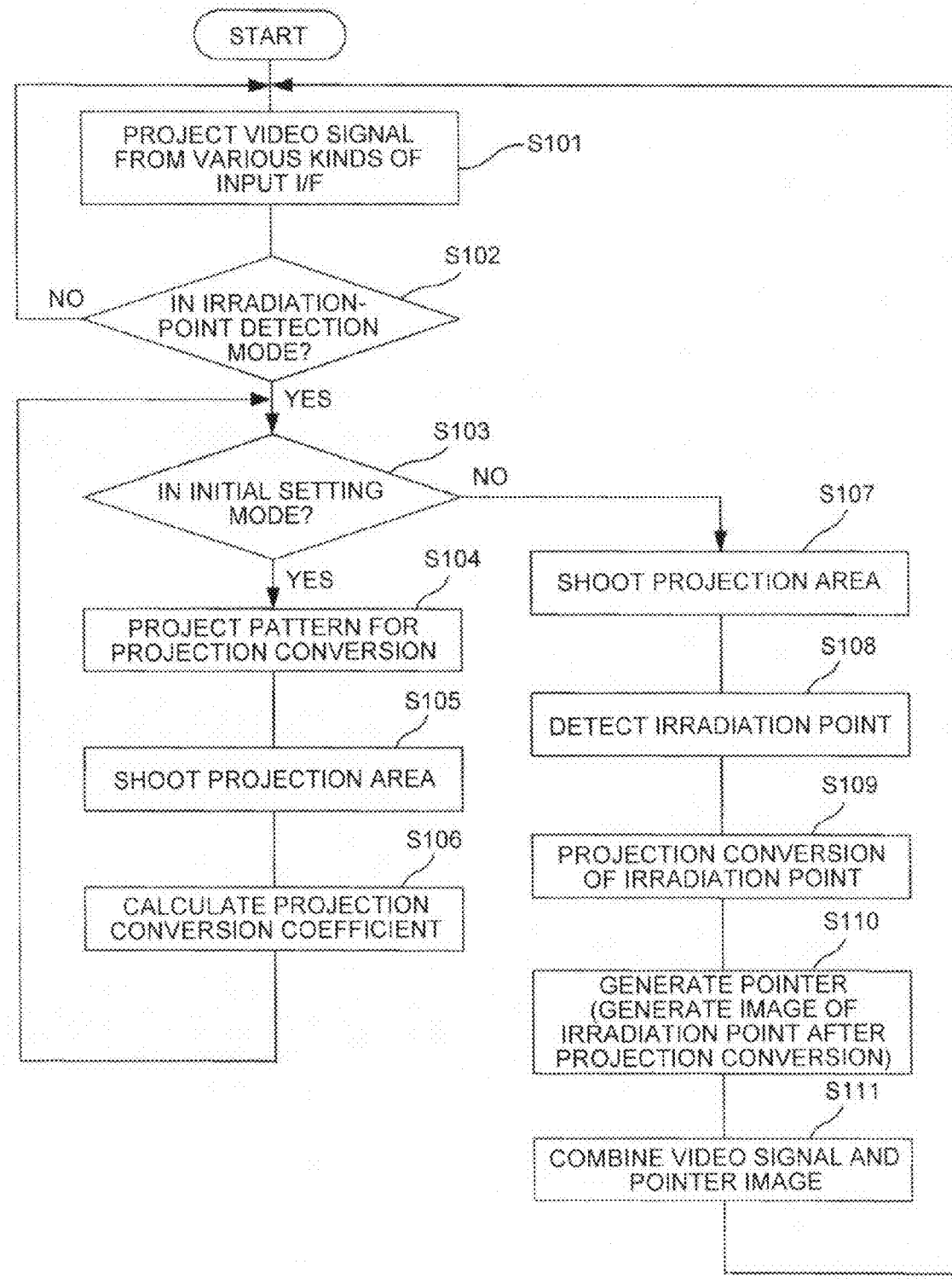
FIG. 12 is a flowchart indicating a process algorism of a drive control unit of the projector device.

Next, calculation of the projection conversion coefficient performed by the projector device 10 according to the present embodiment and a flow in processing of detecting a laser pointer are explained based on FIG. 12. FIG. 12 is a flowchart indicating a process algorism of the drive control unit 14 of the projector device 10. The processing corresponding to the flow chart in FIG. 12 is performed in a unit of one frame of an input video signal.

When this flowchart starts is, as one example, when the external PC 20 is connected to the projector device 10 through a cable and when power of the projector device 10 is turned on.

First, at step S101, the drive control unit 14 performs processing to project a video signal from an input interface (I/F) of a video signal that is input through either one of the input terminals 32, 33, and 34 described above (step S101). This processing includes control to drive the motor 18 that drives to rotate the color wheel 5 according to a video signal, the image forming unit 2, and the lamp power source 17.

At following step S102, the drive control unit 14 determines whether or not an irradiation-point detection mode is set. The irradiation-point detection mode is a mode in which an irradiation point of a laser beam that is irradiated to the screen 30 by the laser pointer 40 is detected, for example. The irradiation-point detection mode is, as one example, activated by operating an operation screen or a button of the projector device 10 when a user uses the laser pointer 40 and the like. When negative determination is made at step S102, in other words, when it is determined that it is not in the irradiation-point detection mode, the process returns to step S101. The processing thus shifts to a next frame of the video signal. Until positive determination is made at step S102, in other words, until the irradiation-point detection mode is set, the processing and determination at steps S101 and S102 are repeated.

On the other hand, when positive determination is made at step S102, in other words, when it is determined that the irradiation-point detection mode is set, the drive control unit 14 determines whether or not it is in an initial setting mode at step S103. The initial setting mode is a mode in which the projection conversion coefficient is calculated when a projection environment changes, and when the irradiation-point detection mode is first activated, it is set in the initial setting mode. For example, a flag dedicated to the initial setting mode is prepared, and when the flag is not raised (reset), it is determined as the initial setting mode, and raising the flag or the like is considered. Other than this, whether or not it is in the initial setting mode may be determined based on whether or not the projection conversion coefficient has been set, whether or not a predetermined time has passed since the projection conversion coefficient is set, or the like. The projection conversion coefficient is a coefficient to correct displacement between an image signal before projection and coordinates of an image pattern when projected.

When positive determination is made at step S103, in other words, when it is determined as the initial setting mode, the drive control unit 14 drives the image forming unit 2 and the like, at step S104, to project an image pattern (see FIG. 4) for projection conversion generated by the video processing unit 12 on the screen 30 (step S104).

At following step S105, the drive control unit 14 instructs the camera unit 22 to shoot the projection area 35 on the screen 30 on which the image pattern described above is projected. This shooting is performed by the camera unit 22 according to an instruction by the drive control unit 14.

At following step S106, the drive control unit 14 instructs the conversion-coefficient calculating unit 26 to calculate the projection conversion coefficient. This calculation of the projection conversion coefficient is performed by the conversion-coefficient calculating unit 26 as follows. That is, the conversion-coefficient calculating unit 26 measures displacement between coordinates of an image pattern that is shot by the camera unit 22 and input through the video-signal input-processing unit 13 and coordinates of the irradiated image pattern in data, and calculates the projection conversion coefficient so that the coordinates of these two data coincide with each other. The calculated projection conversion coefficient is stored, process proceeds to step S103. Here, the sequential process of steps S103, S105, and S106 is implemented in a small amount of time shorter than the time for processing one flame of the image signal.

On the other hand, when negative determination is made at step S103, in other words, when it is determined that it is not in the initial setting mode, process proceeds to step S107, and the drive control unit 14 instructs the camera unit 22 to shoot the projection area 35 on the screen 30. At this time, a laser beam from the laser pointer 40 is irradiated on the screen 30 together with video that is projected at step S101. This shooting at step S107 is performed by the camera unit 22 according to the synchronization signal for shooting that is transmitted from the drive control unit 14 in timing described previously.

At following step S108, the drive control unit 14 instructs the irradiation-point detecting unit 24 to detect an irradiation point. The shooting timing at step S107 described above is determined according to irradiated color of the laser pointer. Therefore, the irradiation-point detecting unit 24 can detect an irradiation point of a laser beam from the laser pointer 40 based on shot image data.

At following step S109, the drive control unit 14 instructs the conversion processing unit 25 to perform projection conversion of the detected irradiation point. That is, coordinates of the detected irradiation point are input to the conversion processing unit 25, and the conversion processing unit 25 performs projection conversion on the coordinates of the irradiation point into coordinates on image data using the projection conversion coefficient calculated by the conversion-coefficient calculating unit 26 and stored.

At following step S110, the drive control unit 14 instructs the pointer generating unit 27 to generate a pointer, that is, a pointer image (irradiation-point display image) to the irradiation point after the projection conversion. The pointer generating unit 27 generates, based on data of the coordinates acquired by performing the projection conversion from the conversion processing unit 25, image data of a pointer to be displayed at the position corresponding to the coordinates in original video signal data.

At following step S111, the drive control unit 14 instructs the video processing unit 12 to combine the video signal with the image data of a pointer. According to an instruction, projection image data to which a predetermined image is added according to the position of the detected irradiation point is generated by the video processing unit 12.

Thereafter, the process returns to step S101. As a result, while the irradiation-point detection mode is set, even if a presenter operates the laser pointer 40 and moves the pointed point (irradiation point), display with the pointer image moved according to the movement thereof is enabled.

Figure 13:
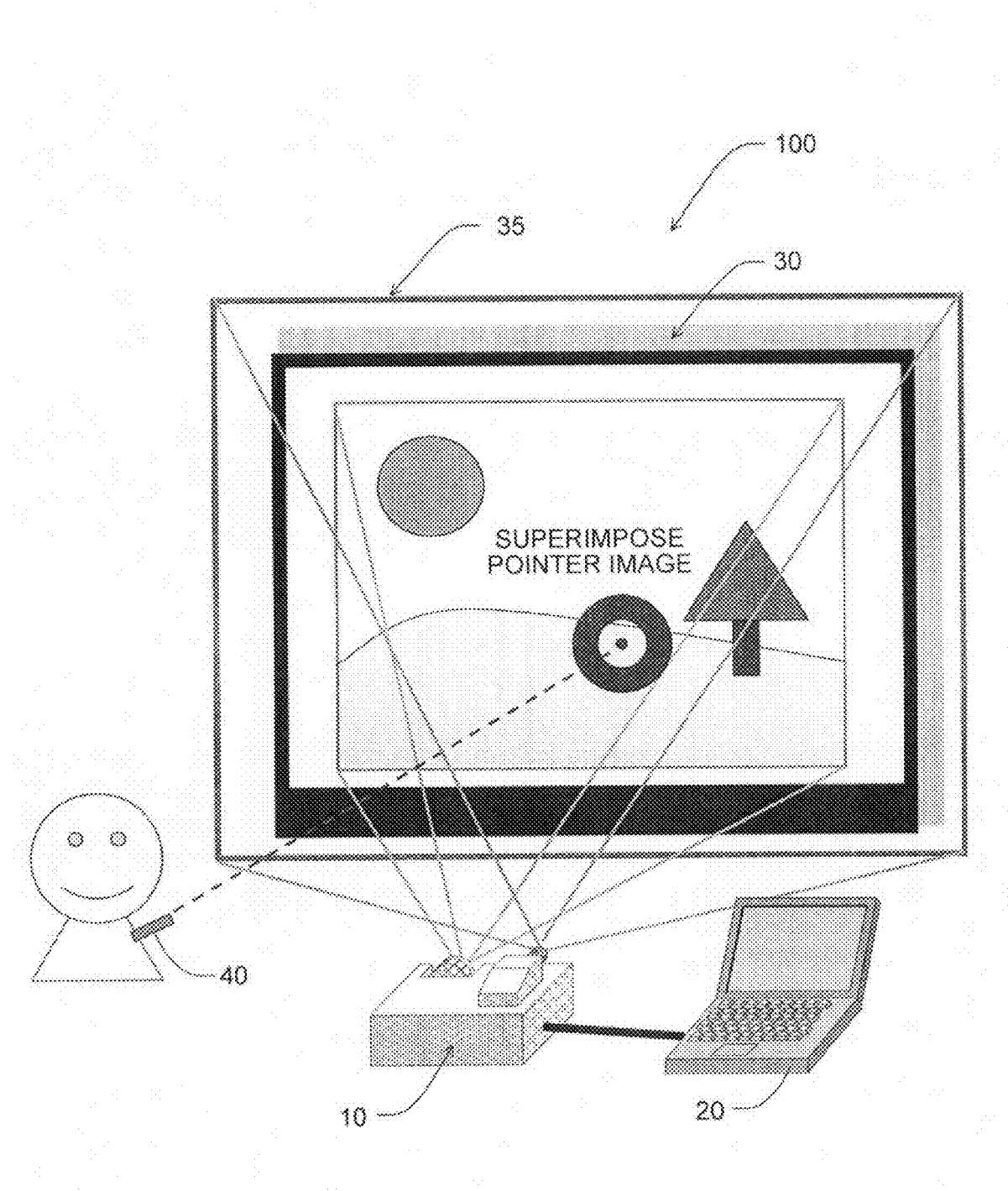
FIG. 13 is a diagram illustrating one projection mode to emphasize an irradiation point of the presentation system of the embodiment.
Figure 14:
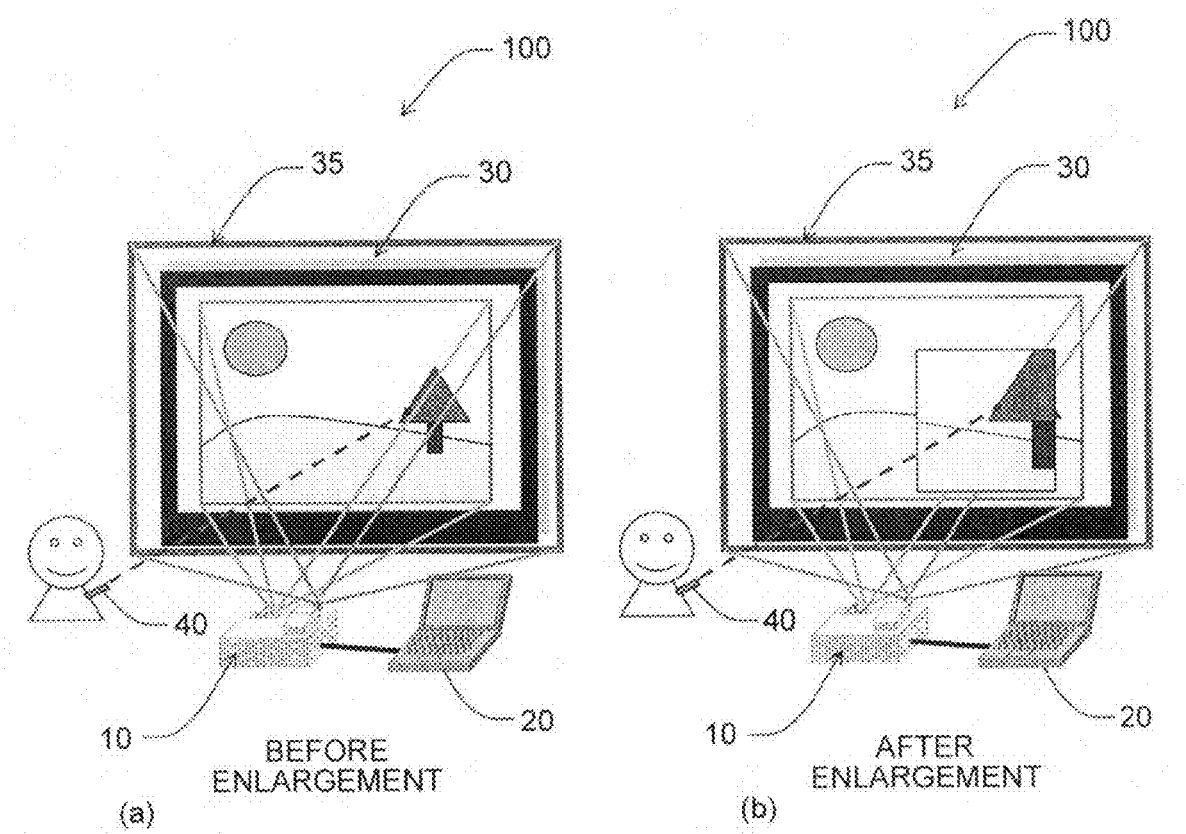
FIGS. 14(a) and 14(b) are diagrams illustrating another projection modes to emphasize an irradiation point of the projector device of the presentation system of the embodiment.

As data of the emphasizing image that is generated at above step S110 and combined to data of a video signal at step S111, in addition to the pointer image described above, to improve the visibility thereof, for example, a ring-shaped image (one of the emphasizing images) that surrounds the calculated irradiation point in center may be displayed as illustrated in FIG. 13, or a circular image indicating the irradiation point may be projected in such a manner that the radius thereof is enlarged with the calculated irradiation point in center. In this case, the pointer is enlarged, and therefore, the pointer becomes more easily viewable. As the emphasizing image, an underline or a box described above may be displayed. In addition to this, as illustrated in FIGS. 14(*a*) and 14(*b*), an area of a part of image data therearound relative to the coordinates of the calculated irradiation point is displayed in an enlarged manner to be projected, instead of enlarging the pointer. Such enlarged display and the like are performed, in the present embodiment, by the drive control unit 14 using the video processing unit 12 to process image data of a projection object as a part of image processing.

As it is obvious from the above explanation, in the present embodiment, a projecting unit is configured with the image forming unit 2, the optical system 3a, the projection system 3b, the light source 4, the video processing unit 12, the drive control unit 14, the lamp power source 17, and the motor 18 included therein. Moreover, a projection-image generating unit is configured with the pointer generating unit 27 and the video processing unit 12 included therein.

Although in the above embodiment, an example in which when laser beams (irradiation points thereof) from laser pointers of multiple colors are detected, the laser beams in multiple colors are detected by a single unit of camera has been explained, it is not limited thereto, and a camera may be equipped for each color to be detected, and detection control may be performed for each color. With such a configuration, time in which a shooting task of the camera unit 22 is not occupied by other colors is eliminated, and a detecting section of each color can be reduced. In this case, it is preferable that which timing corresponds to each of the camera units 22 be set in advance. That is, for example, when three units of camera units are arranged corresponding to three colors of RGB, an irradiation point of a laser pointer of each color can be detected in each cycle.

Furthermore, besides the above, when an intermediate color is desired to be detected, regions of Timing A, B, and C may be divided further precisely for each color. In this case, by shooting in timing corresponding to intermediate color desired to be detected, detection is enabled for each segment of the color wheel 5.

Figure 15:
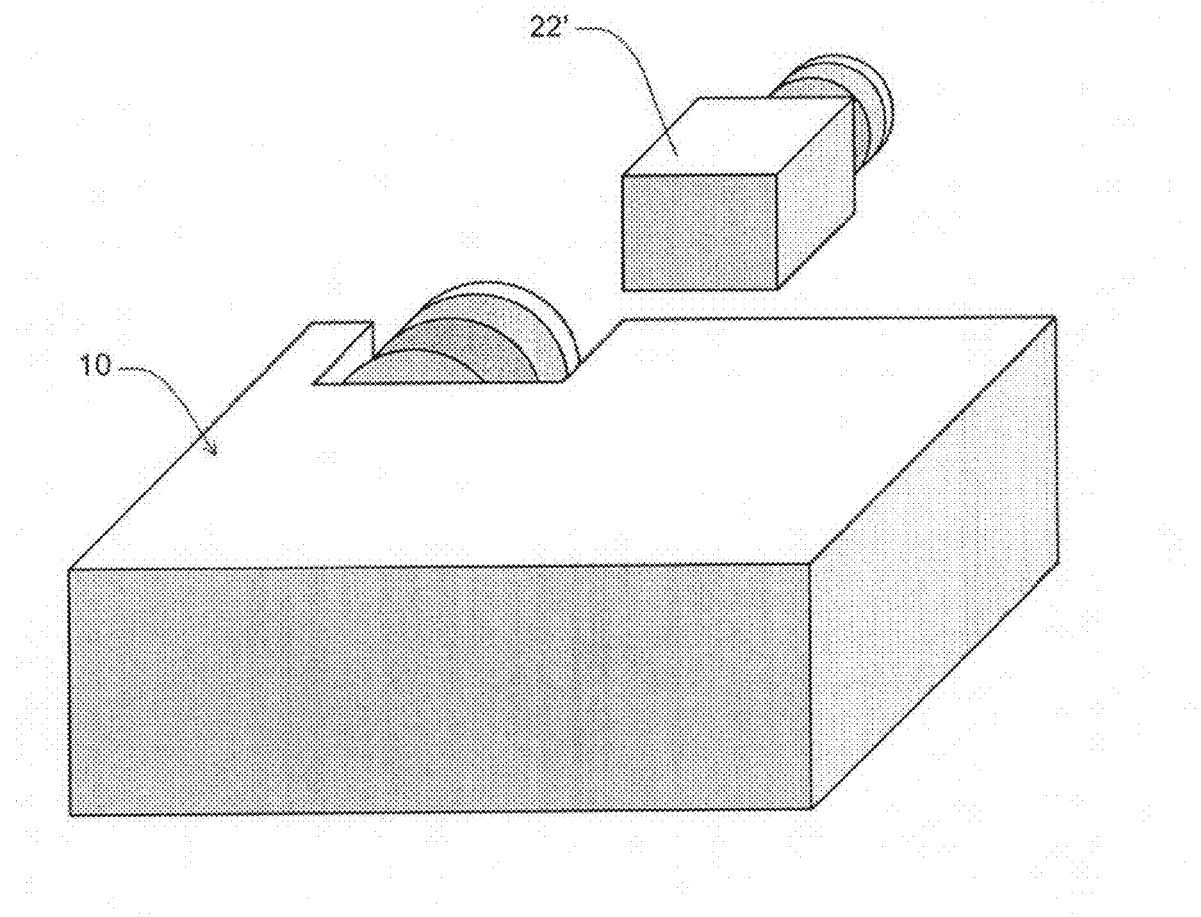
FIG. 15 is an explanatory diagram of another configuration of the presentation system according to the present invention, and illustrates an example of a state of the projector device when a camera is removably arranged.

Although in the above embodiment, the camera unit 22 is arranged in the projector device 10, it is not limited thereto, and for example, a camera unit 22' as the camera unit 22 may be detachably arranged as illustrated in FIG. 15. Alternatively, a CCD camera or the like that constitutes the camera unit 22 separately from the projector device 10 and the external PC may be arranged as a shooting unit. Moreover, although in the above embodiment, a case in which the drive control unit 14 of the projector device 10 serves as the shoot control unit also has been explained, it is not limited thereto, and the external PC 20 may have a function of controlling the camera unit 22. That is, the shoot control unit may be arranged in the external PC. Furthermore, a part of various kinds of functions of the drive control unit 14 in the projector device 10 may be implemented by another control device, or by the external PC. Accordingly, in the presentation system according to the present invention, it is only required to include the shoot control unit, a position detecting unit, and the like as components thereof.

Moreover, although in the above embodiment, a case in which setting of the irradiation-point detection mode is performed by operating an operation screen or a button of the projector device 10 by a user has been exemplified, it is not limited thereto, and such a configuration that an irradiation device such as a laser pointer and the projector device 10 are connected by a wireless line (or wired line), and power-on and off are detected by the drive control unit 14 (the shoot control unit) of the projector device 10 through wireless or wired communication may be applied.

Furthermore, although in the above embodiment, a case in which the projector device 10 is of the DLP type using a color wheel has been explained, it is not limited thereto, and the present invention can be applied also to, for example, a projector device through a liquid crystal display panel referred to as a field sequential type or a presentation system that includes a projector device.

It may be configured such that a program (for example, program to make the CPU execute the processing algorithm corresponding to the flowchart in FIG. 12) that is executed by the projector device 10 of the above embodiment is recorded on a computer-readable recording medium such as a compact-disc read-only memory (CD-ROM), a flexible disk (FD), a compact-disc recordable (CD-R), and a digital versatile disk (DVD), in a file in an installable format or an executable format, to be provided.

Moreover, it may be configured such that a program that is executed in the projector device of the present embodiment is stored in a computer that is connected to a network such as the Internet, and is provided by being downloaded through the network. Furthermore, it may be configured such that a program that is executed in the image projection apparatus of the present embodiment is provided or distributed through the network such as the Internet.

A program that is executed in the image projection apparatus of the present embodiment has a module configuration including the respective components described above, and the respective components are loaded on a main storage device by reading and executing the program from the above ROM by a CPU (processor) as actual hardware, thereby generating the respective components on the main storage device. Furthermore, each component in the projector device 10 may be implemented as software by a program, or as hardware with combination of predetermined electronic circuits.

The image projection apparatus of the present invention produces such an effect that an irradiation point of light from an irradiation device can be stably detected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus comprising:
a projecting device that projects and displays on a projection surface each image in a time sharing manner for each of a plurality of color components, for an input image signal, wherein the projecting device includes a color wheel having a plurality of different color filters that are used to project the plurality of color components;
an image capturing device that captures a projected image on the projection surface; and
circuitry configured to:
  detect, on the projection surface, a color of an irradiation point irradiated from an irradiation device;
  determine a timing with respect to one of the plurality of color components based on the detected color of the irradiation point, the determined timing representing a timing in which the one of the plurality of color components is not projected by the projecting device;
  set a period of exposure time in relation to the plurality of different color filters, the set period of exposure time being set to a period from a point of time delayed from a start of the determined timing to a point of time earlier than an end of the determined timing; and detect a position of the irradiation point based on the capturing of the projected image during the set period of exposure time.

2. The image projection apparatus according to claim 1, wherein the plurality of color filters are arranged on an identical circumference in sections and pass light from a light source, and the circuitry is further configured to:

detect a rotation position of the color wheel, and control the image capturing device to perform the capturing based on the detected rotational position.

3. The image projection apparatus according to claim 2, wherein the circuitry is further configured to set a shutter timing along with the set period of exposure time.

4. The image projection apparatus according to claim 1, wherein the circuitry is further configured to perform an image processing to display a predetermined emphasizing display image at the detected position of the irradiation point, or perform an image processing to display an image corresponding to image data in a part of an area around the detected position of the irradiation point in an enlarge manner.

5. The image projection apparatus according to claim 1, wherein the circuitry is further configured to:

detect a plurality of different colors of the irradiation device.

6. The image projection apparatus according to claim 1, further comprising:

additional image capturing devices, wherein the circuitry is configured to control the image capturing device to perform the capturing or the additional image capturing devices to perform capturing of a projected image, based on the detected color.

7. A presentation system comprising:

a projecting device that projects and displays on a projection surface each image in a time sharing manner for each of a plurality of color components, for an input image signal, wherein the projecting device includes a color wheel having a plurality of different color filters that are used to project the plurality of color components;

an image capturing device that captures a projected image on the projection surface;

a irradiation device that forms an irradiation point by irradiating light onto the projection surface; and circuitry configured to:

detect, on the projection surface, a color of the irradiation point irradiated from the irradiation device;

determine a timing with respect to one of the plurality of color components based on the detected color of the irradiation point, the determined timing representing a timing in which the one of the plurality of color components is not projected by the projecting device;

set a period of exposure time in relation to the plurality of different color filters, the set period of exposure time being set to a period from a point of time delayed from a start of the determined timing to a point of time earlier than an end of the determined timing;

detect a position of the irradiation point based on the capturing of the projected image during the set period of exposure time.

8. The presentation system according to claim 7, wherein the circuitry is further configured to determine whether or not a detection mode of the irradiation device is set, by detecting power-on and off of the irradiation device by any one of wireless and wired communication.

* * * * *